(12) United States Patent
Weaver et al.

(10) Patent No.: US 7,357,243 B2
(45) Date of Patent: Apr. 15, 2008

(54) PACKAGING MACHINE AND METHOD

(75) Inventors: J. Michael Weaver, Madison, CT (US); Jeffrey Reilly, Killingworth, CT (US); Emilio Cofrancesco, Middletown, CT (US); Alexander Bozzi, Middletown, CT (US); Nicholas Pini, Portland, CT (US)

(73) Assignee: Standard Knapp, Inc., Portland, CT (US)

( * ) Notice: Subject to any disclaimer, the term of this patent is extended or adjusted under 35 U.S.C. 154(b) by 0 days.

(21) Appl. No.: 11/523,143

(22) Filed: Sep. 19, 2006

(65) Prior Publication Data

US 2007/0011995 A1    Jan. 18, 2007

Related U.S. Application Data

(62) Division of application No. 11/095,427, filed on Mar. 31, 2005, now Pat. No. 7,124,558, which is a division of application No. 10/005,457, filed on Nov. 2, 2001, now Pat. No. 6,895,730.

(60) Provisional application No. 60/245,889, filed on Nov. 3, 2000.

(51) Int. Cl.
*B65G 43/00* (2006.01)
*B65B 35/30* (2006.01)

(52) U.S. Cl. ........................... 198/437; 53/543

(58) Field of Classification Search ................ 198/890, 198/890.1, 369.1, 369.5, 437, 418.5, 419.3; 53/543
See application file for complete search history.

(56) References Cited

U.S. PATENT DOCUMENTS

| | | | |
|---|---|---|---|
| 3,057,136 A | 10/1962 | Walter | 23/262 |
| 3,193,078 A | 7/1965 | Amenta et al. | 198/419.1 |
| 3,325,967 A | 6/1967 | Wild | 53/262 |
| 3,353,331 A | 11/1967 | Rowekamp | 53/539 |
| 3,561,189 A | 2/1971 | Raudat | 53/497 |
| 3,641,735 A | 2/1972 | Daily et al. | 53/537 |
| 3,996,723 A | 12/1976 | Greenwell | 53/500 |
| 4,069,908 A * | 1/1978 | Johnson et al. | 198/437 |
| 4,173,276 A * | 11/1979 | Raudat et al. | 198/437 |
| 4,408,436 A | 10/1983 | Glover | 53/247 |
| 4,432,189 A | 2/1984 | Raudat | 53/497 |
| 4,462,516 A | 7/1984 | Guerzoni | 198/427 |
| 4,534,153 A | 8/1985 | Nowicki | 53/247 |
| 4,608,804 A | 9/1986 | Wild | 53/262 |
| 4,616,745 A * | 10/1986 | Hartness | 198/442 |
| 4,635,784 A | 1/1987 | Bourgeois | 198/429 |
| 4,709,536 A | 12/1987 | Hartness et al. | 53/539 |
| 4,723,649 A | 2/1988 | Hartness et al. | 198/442 |
| 4,793,117 A | 12/1988 | Raudat et al. | 53/48 |
| 4,835,946 A * | 6/1989 | Hartness et al. | 53/539 |

(Continued)

*Primary Examiner*—Douglas A Hess
(74) *Attorney, Agent, or Firm*—Cantor Colburn LLP

(57) ABSTRACT

The packaging machine includes: a plurality of lane guides, the plurality of lane guides being spaced apart to form a plurality of lanes; a moveable conveyor belt having a first end and second end, the first end located beneath one of the plurality of lanes, the movable conveyor belt delivers the product to each of the plurality of lanes; a support device located at the plurality of lanes; and a shifting assembly attached to the plurality of lane guides. The method for packaging a case with a product includes: conveying a first plurality of the product to a first lane; supporting the first plurality of the product within the first lane; conveying a second plurality of the product to a second lane; shifting the first lane and the second lane in a first direction; and dropping the first plurality of the products into the case.

6 Claims, 10 Drawing Sheets

U.S. PATENT DOCUMENTS

| | | | |
|---|---|---|---|
| 4,846,336 A * | 7/1989 | Hoyland et al. | 198/432 |
| 4,880,104 A * | 11/1989 | Evans et al. | 198/445 |
| 4,986,056 A | 1/1991 | Evans et al. | 53/539 |
| 5,107,978 A * | 4/1992 | Andrew | 198/437 |
| 5,150,563 A * | 9/1992 | Hartness | 53/539 |
| 5,174,430 A | 12/1992 | Shusaku | 198/418.5 |
| 5,212,930 A | 5/1993 | Raudat | 53/263 |
| 5,212,932 A | 5/1993 | Raudat | 53/539 |
| 5,335,482 A * | 8/1994 | Kinigakis et al. | 53/448 |
| 5,394,673 A * | 3/1995 | Hartness | 53/248 |
| 5,439,094 A * | 8/1995 | Hakansson | 198/419.1 |
| 5,588,282 A | 12/1996 | Hartness | 53/473 |
| 5,603,398 A | 2/1997 | Crouch | 198/459.2 |
| 5,699,651 A | 12/1997 | Miller et al. | 53/448 |
| 5,778,634 A | 7/1998 | Weaver et al. | 53/250 |
| 5,944,165 A | 8/1999 | Mannlein et al. | 198/442 |
| 6,061,996 A | 5/2000 | Vissers et al. | 53/247 |
| 6,276,409 B1 * | 8/2001 | Ellison | 141/234 |
| 6,540,063 B1 | 4/2003 | Fallas et al. | 198/419.3 |
| 6,772,872 B2 * | 8/2004 | Spangenberg et al. | 198/442 |
| 6,810,645 B2 * | 11/2004 | Cerf | 53/531 |
| 6,895,730 B2 * | 5/2005 | Weaver et al. | 53/500 |
| 7,114,609 B2 * | 10/2006 | Christman et al. | 198/442 |
| 7,124,558 B2 * | 10/2006 | Weaver et al. | 53/539 |

* cited by examiner

PACKAGING MACHINE AND METHOD

CROSS-REFERENCE TO RELATED APPLICATION

The present application is a divisional application of U.S. patent application Ser. No. 11/095,427 filed on Mar. 31, 2005 now U.S. Pat. No. 7,124,558 which is a divisional application of U.S. patent application Ser. No. 10/005,457, filed Nov. 2, 2001 now U.S. Pat. No. 6,895,730, which claims the benefit of U.S. Provisional Patent Application No. 60/245,889 filed Nov. 3, 2000, which is incorporated in its entirety herein by reference.

BACKGROUND OF THE INVENTION

Automated packaging devices are often used in high volume production facilities to prepare products for sale and shipment. One common automated packing device is a packaging machine, which divides up the product and drops it into a box or case. The packaging machine typically consist of five sections; a product infeed section, a case feed section, a lift table section, a grid table section and an operator interface section.

The product infeed section of the packaging machine includes a conveyor belt that transfers the product from an up stream process such as filling or labeling, in a serial fashion. The conveyor belt urges the product into grid lanes that align the product into a plurality of rows. Distribution of the product between the grid lanes is accomplished using the force of the conveyor belt and the force created between the individual product items to distribute the product between fixed, stainless steel lane guides. As the product passes between the lane guides, it rests on support strips positioned below the product. At the end of each grid lane is a separation bar, which stops the first product to enter the grid lane. The product is monitored using electronic sensors as it is fed into a grid lane. When the grid lane is filled with the desired amount of product, a brake is applied to stop the serial flow of product in the conveyor belt and, thereby, prevent further product from entering the lane guides.

While the infeed section fills the grid with product, the case feed section delivers empty boxes or cases onto the lift table via a conveyor. The lift table section lifts the cases to a point beneath the grid lanes and waits for product to enter the case before descending. The lift table section is equipped with an air or oil lift table that prompts the up and down motion of the table. As the grid area is filled with product the lift table rises. Once the product is placed in the case, the lift table lowers. The case feed section then discharges the filled case, and an empty case enters the lift table. The operation will then repeat, depending on the number of products in the infeed section.

The grid section is responsible for releasing the product into the empty cases on the lift table. The grid section accomplishes the release of the product using two primary components: the support strip on which the product rests as it enters the grid area, and a grid basket, which guides the product into the case. Once the grid lanes are filled with product, the support strips are shifted to the side allowing the product to fall through the grid basket into the case or box. The support strips are then returned to their original position and the link brake is released allowing subsequent product to be moved from the product infeed into the grid.

An operator interface section controls the system and allows the operator to manage the operation of the machine. Typically, the interface is mounted on a swing boom that enables the operator to control the machine from either side to facilitate viewing of the process. This interface consists of a series of pushbuttons, which enable the operator to start, stop, or alter the performance of the machine, and locate/correct any fault conditions.

As discussed above, the line brake is applied to the infeed conveyor to prevent over filling of the lanes. The application of the brake causes the upstream product to compress together. This compression of the product is known as "line pressure". Also, as discussed above, the product infeed section divides the product into grid lanes using the force of the conveyor belt and the force created between individual product items. As the product is forced into the grid lanes, the first product to enter the grid lane is forced against the separation bar, and the subsequent products are forced against the first product and against each other. This pressure between the products in the grid lane is known as "wind up". Despite that line pressure and wind-up cause problems in the packaging operation, they are often used to help move the product in to the grid lanes. Therefore, there is a delicate balance that must be achieved to use line pressure and wind-up without causing problems in the process.

Line pressure results in two main problems in the packaging operation. The first depends on the product being packaged. If the product is made of a glass or plastic oval shape base that has a thinner wall towards the front and back of the base and a thicker wall in the center of the base, excess line pressure may cause the product to break or deform causing delays in the operation as the damaged product is removed and the line is cleared. The second problem occurs with products having irregularly shaped containers (i.e. containers not shaped as a cylinder or parallel-piped). Because the containers are irregularly shaped, contact of containers against each other may cause tipping of adjacent containers resulting in interlocking, tipping, or mispackaging of the product, which again causes delays. To overcome the problems associated with packaging irregularly shaped products, prior art devices used additional devices such as an inflatable membrane to hold the product and prevent it from tipping.

Wind-up tends to cause problems in the packaging lanes. Most cases have product dividers or partitions that protect the product during shipment. Since the product within the lane is in a wound-up state, a gap must be created between the products before they pass into the case. Prior art packaging machines used a separation bar located on the end of the lane to release the wind-up. Once the lane is filled, the separation bar moves away from the row of product, releasing the wind-up. Unfortunately, this technique does not always work well with irregularly shaped products since the wind-up may cause the products to interlock or tip within the grid lanes.

Accordingly, it is considered to be advantageous to have a packaging machine with an infeed section that is able to deliver product into the grid lanes without the problems associated with line pressure or wind-up. It is also advantageous to have a packaging machine capable of continuously filling grid lanes without the use of a line brake. It is also considered advantageous to have a packaging machine capable of continuously filling grid lanes where the products are packaged on a first-in, first-out basis. It is also considered advantageous to provide a packaging machine capable of continuously packaging cases containing variety packs.

SUMMARY OF THE INVENTION

These and other drawbacks or deficiencies are overcome by an apparatus and a method for packaging a case with products. The packaging machine includes: a plurality of lane guides, the plurality of lane guides being spaced apart to form a plurality of lanes; a moveable conveyor belt having a first end and second end, the first end located beneath one of the plurality of lanes, the movable conveyor belt delivers the product to each of the plurality of lanes; a support device located at the plurality of lanes; and a shifting assembly attached to the plurality of lane guides. The method for packaging a case with a product includes: conveying a first plurality of the product to a first lane; supporting the first plurality of the product within the first lane; conveying a second plurality of the product to a second lane; shifting the first lane and the second lane in a first direction; and dropping the first plurality of the products into the case.

BRIEF DESCRIPTION OF THE DRAWINGS

These and other features, aspects, and advantages of the present invention will become better understood with reference to the following description, claims and accompanying drawings in which:

DETAILED DESCRIPTION OF THE INVENTION

A product must go through a number of steps to transform the raw material into a useful product. These steps can be numerous, including the mixing and processing of the raw material to create the base product, filling containers with the base product and labeling the container to create the final product. Usually one of the last steps before shipment to a customer is the packaging of the final product (hereafter referred to as the product) into conveniently sized case or box that will hold and protect the product during shipment. In high volume facilities, the process of filling cases with product is usually automated to reduce manufacturing cost.

Figure 1:
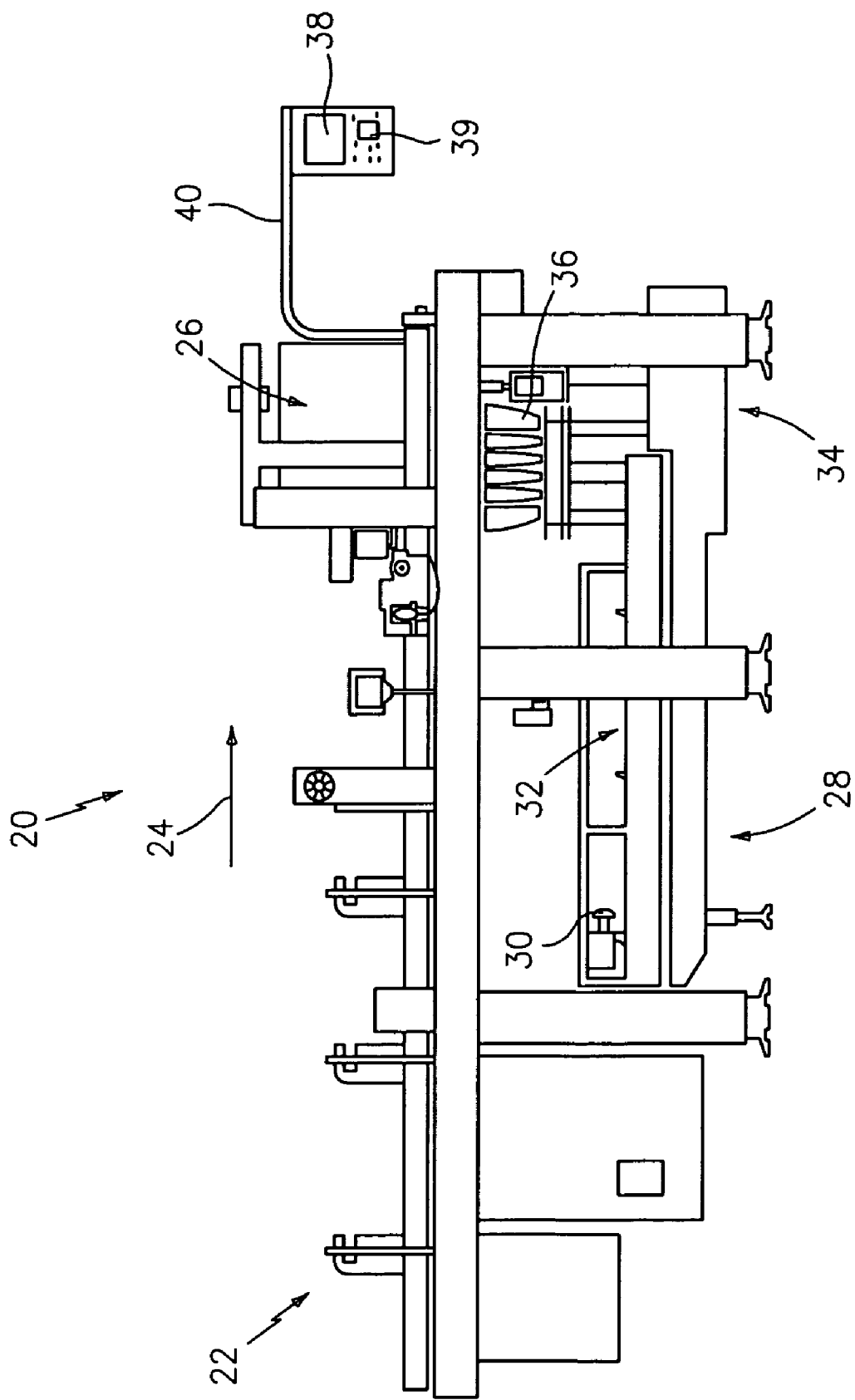
FIG. 1 is a side plan view of a packaging machine in accordance with the present invention.

Referring to FIG. 1, an automated packaging machine 20 is shown. The packaging machine 20 has a product infeed section 22 located at one end for receiving products from an upstream processing station (not shown). A product (not shown) will flow along the infeed section 22 in the direction indicated by arrow 24 to a grid section 26. While the grid section 26 is being filled with the product, a case feed section 28 will open an empty case (not shown) using an opener 30. Once opened, a conveyor 32 delivers the empty cases to a lift table 34, which raises the case up under the grid 26. When the grid section 26 is filled with the appropriate amount of product, the product descends through a grid basket 36 into the case. The full case is lowered and removed by a conveyor (not shown) for further downstream processing and shipping. The process is now ready to repeat with the grid section 26 filling with product and an empty case being positioned to receive product. The operation of the packaging machine 20 is controlled from an operator interface 38, which may include a controller 39, mounted to a movable boom 40. Controller 39 may be programmed to control the operation of the packaging machine 20.

Figure 2A:
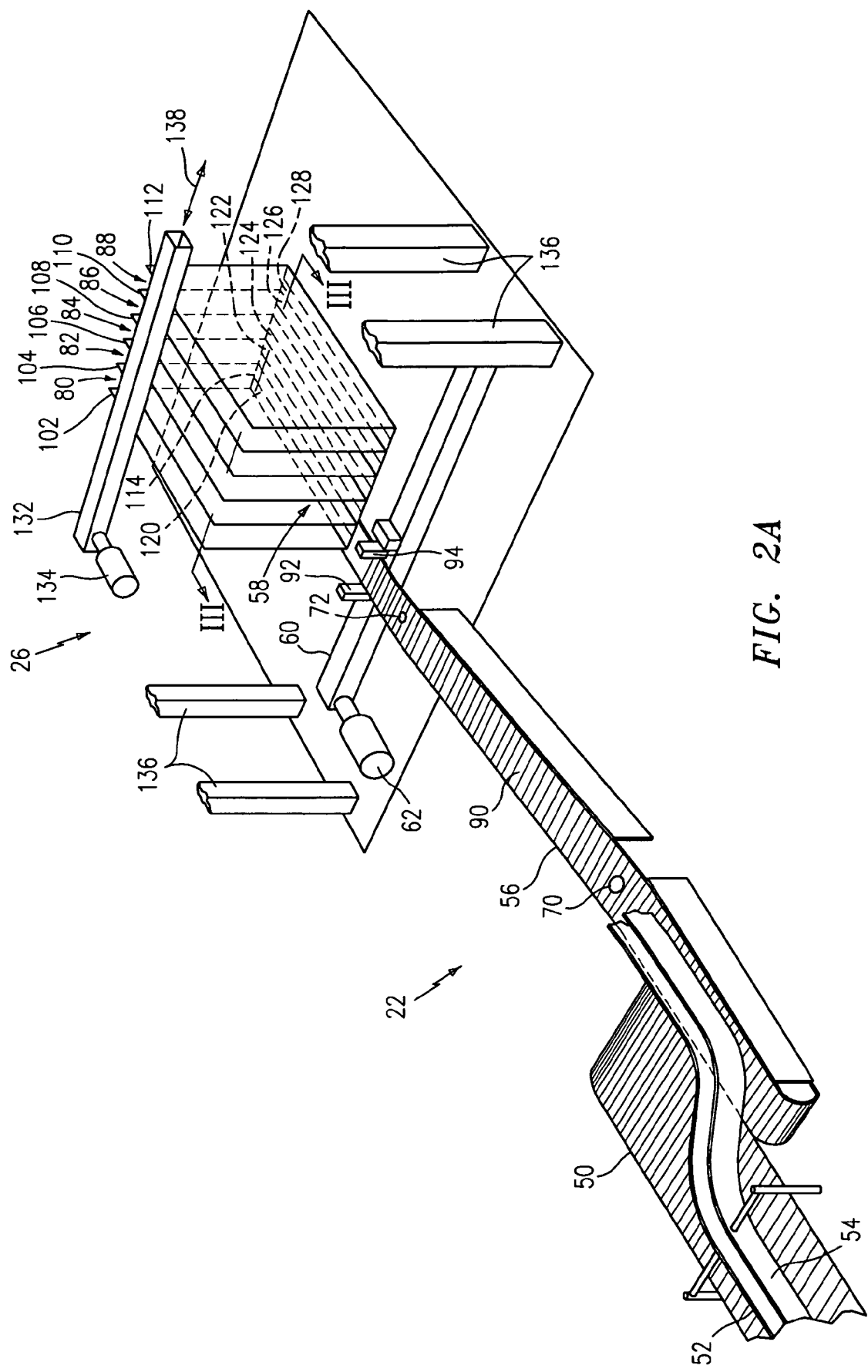
FIG. 2A is a top perspective view of the product infeed and grid sections of the packaging machine shown in FIG. 1.

The product infeed section 22 is best seen in FIG. 2A. A first conveyor 50 receives the product (not shown) in a serial fashion from an upstream station (not shown). A pair of flex guides 52 and 54 supports and guides the product as the conveyor 50 moves the product along the first conveyor 50. The first conveyor 50 is connected to a second conveyor 56 so that the product moves from the first conveyor 50 to the second conveyor 56.

The second conveyor 56 extends from the first conveyor 50 to an end section 58 of the second conveyor 56, which is located at the grid section 26. The end section 58 is coupled to a gear assembly 60, which is driven by a motor 62. The motor 62 may be a servo motor, a start/stop electric motor, or even air cylinders. The second conveyor 56 has a pair of pivots 70 and 72, which allow the end section 58 to move laterally along gear assembly 60 while still remaining parallel to a plurality of grid lanes 80, 82, 84, 86, and 88. An additional motor (not shown), which may be a servo motor, a start/stop electric motor, or even air cylinders, drives a belt 90 of the second conveyor 56. The motor 62 and the additional motor (not shown) may be coupled to their respective assemblies by clutches (not shown), which allow the operator to disconnect the motors in the event of a jam or dislodged product. In addition, the motor 62 and the additional motor (not shown) may be in electronic communication with the controller 39 (see FIG. 1).

The second conveyor 56 has a pair of sensors 92 and 94, which are mounted to the gear assembly 60. The sensor 92 is used to count the number of products entering the grid lanes 80, 82, 84, 86, and 88. This allows the packaging machine 20 to determine when a grid lane is filled with product. The sensor 94 may be used as a back up for the sensor 92.

The grid section 26 includes the grid lanes 80, 82, 84, 86, and 88, which are formed between a plurality of parallel, spaced apart plates (lane guides) 102, 104, 106, 108, 110, and 112. Second conveyor 56 is positioned so that the end section 58 extends under and to an end 114 of the grid lane 80. A series of support devices, which are illustrated as stationary support strips 120, 122, 124, 126, and 128, are positioned under and parallel to the grid lanes 80, 82, 84, 86, and 88 and the second conveyor 56. Located adjacent to and at the end of each grid lane 80, 82, 84, 86, and 88 is a shock absorbing device 130 (shown on FIG. 3).

Each of the lane guides 102, 104, 106, 108, 110, and 112 that make up the grid lanes 80, 82, 84, 86, and 88 are mounted to a gear assembly 132. The gear assembly 132 is driven by a motor 134, which may be a servo motor, a start/stop electric motor, or even air cylinders. The motor 134 is mounted to a packaging machine frame 136. As will be described in more detail herein, the motor 134 drives the gear assembly 132 which moves the lane guides 102, 104, 106, 108, 110, and 112 in a direction perpendicular to the support strips 120, 122, 124, 126, and 128 as indicated by an arrow 138. The motor 134 may be in electronic communication with the controller 39 (see FIG. 1).

In the exemplary embodiment, the lane guides 102, 104, 106, 108, 110, and 112 and support strips 120, 122, 124, 126, and 128 are laterally adjustable. This allows the packaging machine 20 to be reconfigured for different products by adjusting the lateral distance between adjacent lane guides. Alternatively, to simplify the assembly, nonadjustable lane guides 120, 122, 124, 126, and 128 may be removably mounted to the gear assembly 132. In this alternate embodiment, different sets of lane guides would be utilized for different sized products.

Figure 2B:
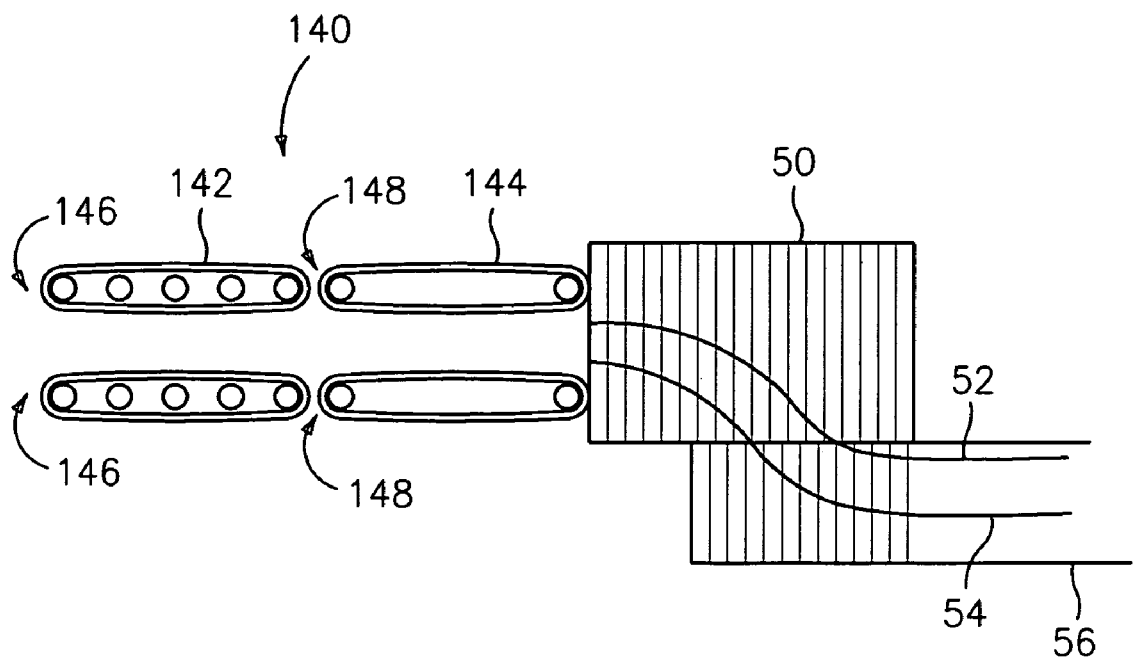
FIG. 2B is a top plan view illustrating an alternate embodiment infeed section of FIG. 2A utilizing side belts.

In an alternate embodiment, shown in FIG. 2B, the product infeed section 22 also includes a spacing mechanism that spaces the product as it moves through the spacing mechanism. In an exemplary embodiment, the spacing mechanism includes a side belt assembly 140 located upstream from the conveyor 50. The side belt assembly 140 consists of at least two pairs of belts 142 and 144. Each belt pair 142 and 144 is spaced apart to allow the product (not shown) to pass in between while still maintaining contact with the sides of the product. A motor (not shown) drives the belts 142 and 144 in the direction indicated by arrows 146 and 148. As the product (not shown) travels through the center of each pair of belts 142 and 144, the product will contact the belts 142 and 144 and will move forward at the same speed as the belts 142 and 144. By rotating the belt 144 at a faster rate than the belt 142, the spacing between the products may be altered. The significance of this spacing for proper packaging will be made clearer herein. As the product exits belts 144, the product is transferred to the conveyor 50.

Figure 2C:
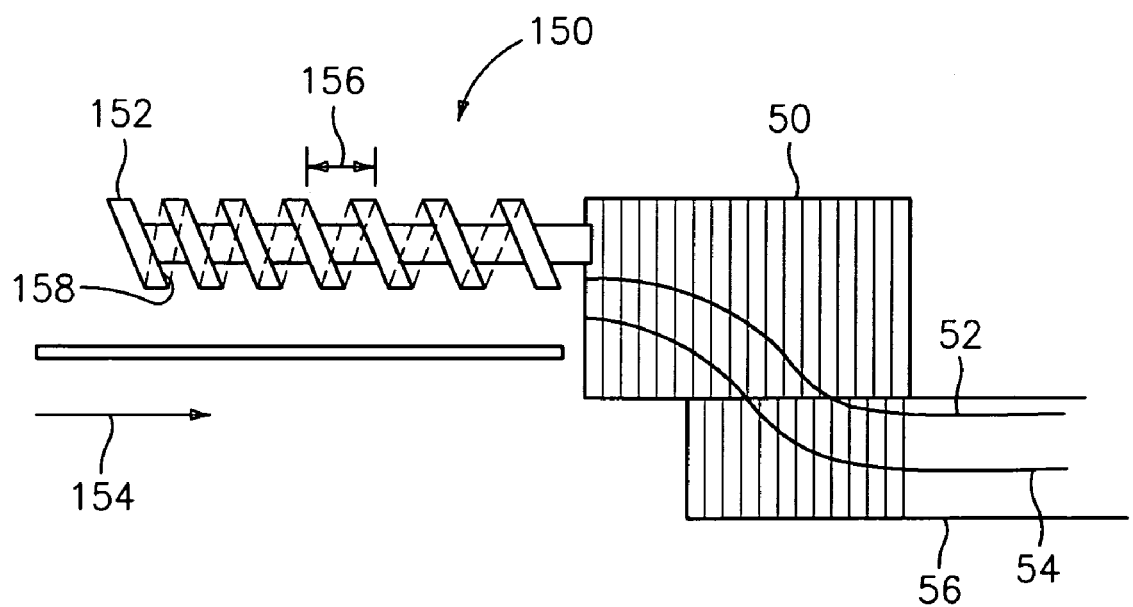
FIG. 2C is a top plan view illustrating an alternate infeed section of FIG. 2A utilizing a timing screw.

Another alternate embodiment of the spacing mechanism is shown in FIG. 2C. In this embodiment, a timing screw 150 is utilized. The screw 150, similar to a worm gear, provides a number of threads 152 which pickup the product (not shown) from the upstream process (not shown) and advances it downstream in the direction of arrow 154. Since the screw 150 has a variable pitch, i.e. a gap 156 between a front surface 158 of adjacent threads 152 increases along the length of the screw 150. This increasing gap 156 also increases the distance between adjacent products. Such that as the product leaves the screw 150 and is transferred to the conveyor 50 at the appropriate spacing for packaging.

Figure 2D:
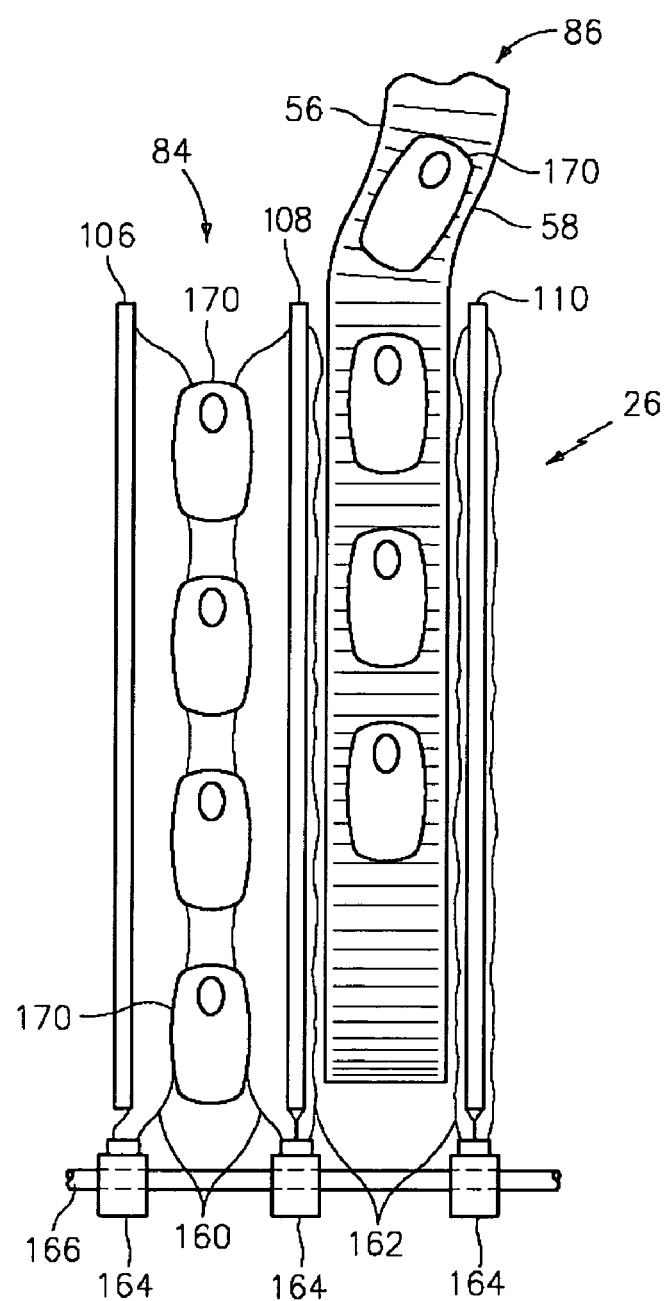
FIG. 2D is a partial plan view of an alternate embodiment the grid section of FIG. 2A utilizing inflatable bladders.

An alternate embodiment of the support devices of the grid section 26 is illustrated in FIG. 2D. The support devices may be any type of support device that holds the product as the second conveyor 56 moves to each lane and fills each lane. The support device is employed to hold the product until the appropriate number of lanes is filled. Once the appropriate number of lanes is filled, the support device is removed and the product in the lanes descends to the case feed section 28 located beneath the grid section 26.

In an alternate embodiment, bladder pairs 160 and 162 eliminate the need for the support strips 120, 122, 124, 126, and 128 and for the shock absorbing device 130, both illustrated in FIG. 2A. FIG. 2D is only a partial view of the grid section 26. Thus, while only bladder pairs 160 and 162 are illustrated, the bladder pairs would replace each support strip for each grid lane illustrated in FIG. 2A.

Each bladder pair 160 and 162 is associated with a particular grid lane 84 and 86 respectively. Grid lane 84, which includes lane guides 106 and 108, is illustrated with bladder pair 160. One of each bladder pair 160 is attached to lane guide 106 and 108. Grid lane 86, which includes lane guides 108 and 110, is illustrated with bladder pair 162. One of each bladder pair 162 is attached to lane guides 108 and 110. Each of the bladder pairs 160 and 162 are attached at a valve 164, which is connected to an air supply 166. Air supply 166 provides air through valve 164 to bladder pair 160 and 162.

As the conveyor 56 fills a lane with a product 170, valve 164 opens and supplies air to the bladder pair associated with the grid lane. Lane 84 illustrates bladder pair 160 inflated with air and shows bladder pair 160 surrounding the product 170. When bladder pair 160 is inflated with air, bladder pair 160 stops the forward motion of the product 170 and holds the product 170 in place. Lane 86 illustrates bladder pair 162 deflated and the product 170 moving in a forward motion.

Figure 3:
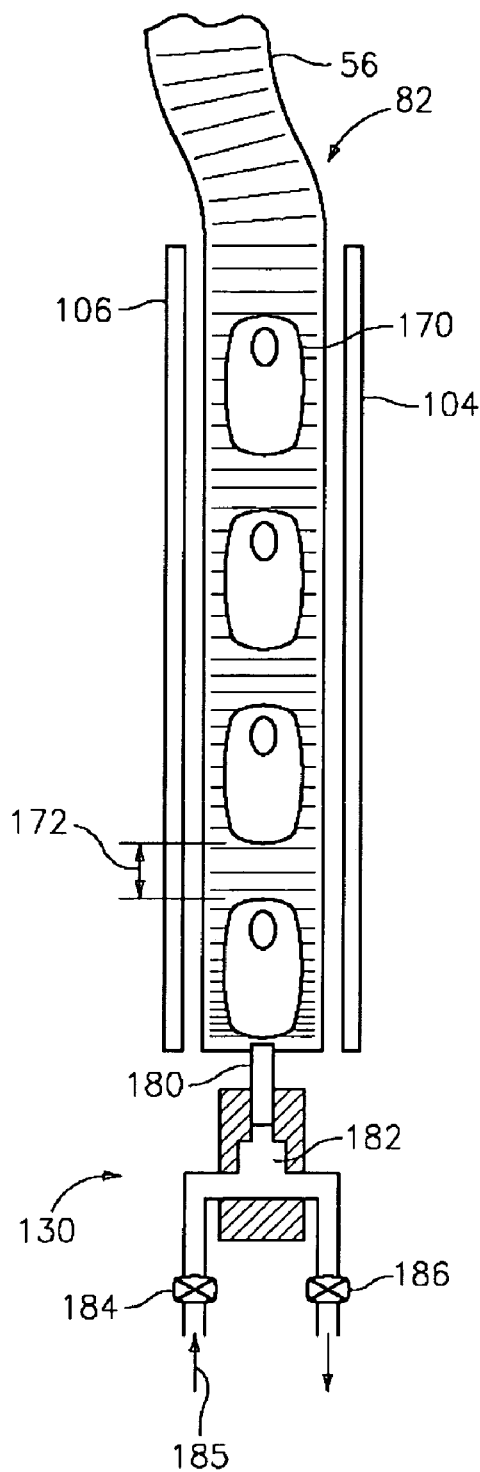
FIG. 3 is a top plan view, partially in section, illustrating a grid lane having a shock absorber.

Referring to FIG. 3, the shock absorbing device 130 is illustrated. The shock absorbing device 30 includes a plunger 180 connected to a chamber 182, which is connected to air valves 184 and 186.

Operation of the packing machine 20 can be described with reference with FIGS. 3-12. First referring to FIGS. 3-5, as the second conveyor 56 continuously moves the product 170 at a constant speed into the lane 82, the first sensor 92 counts the product 170. The products 170 are each speed at a distance equal to a gap 172. The products 170 move into the lane until the first product 170 contacts the shock absorbing device 130. To prevent tipping of the product 170 as it slowed to a stop, the first product 170 in the lane 82 contacts the plunger 180 resulting in the displacement of air from the chamber 182 through the valve 186.

Figure 5:
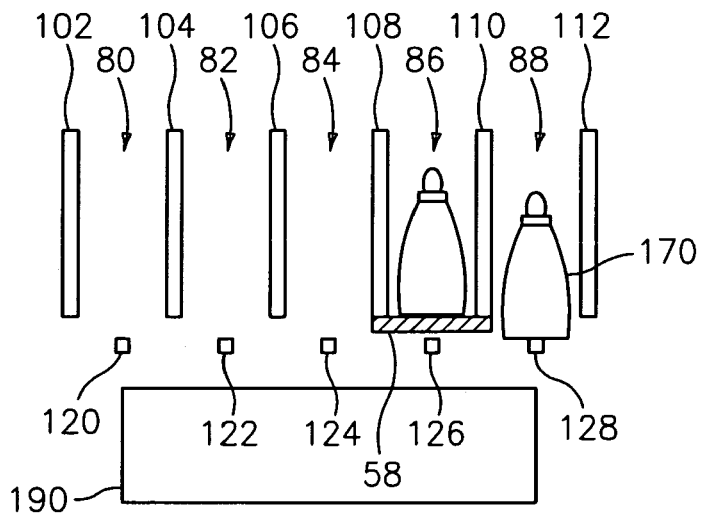
FIG. 5 is an end plan view of the grid section of FIG. 2A with the second lane being filled with product.
Figure 6:
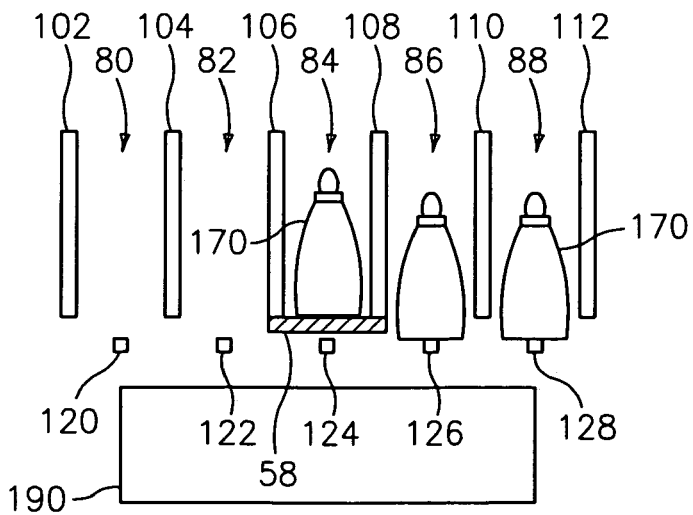
FIG. 6 is an end plan view of the grid section of FIG. 2A with the third lane being filled with product.
Figure 7:
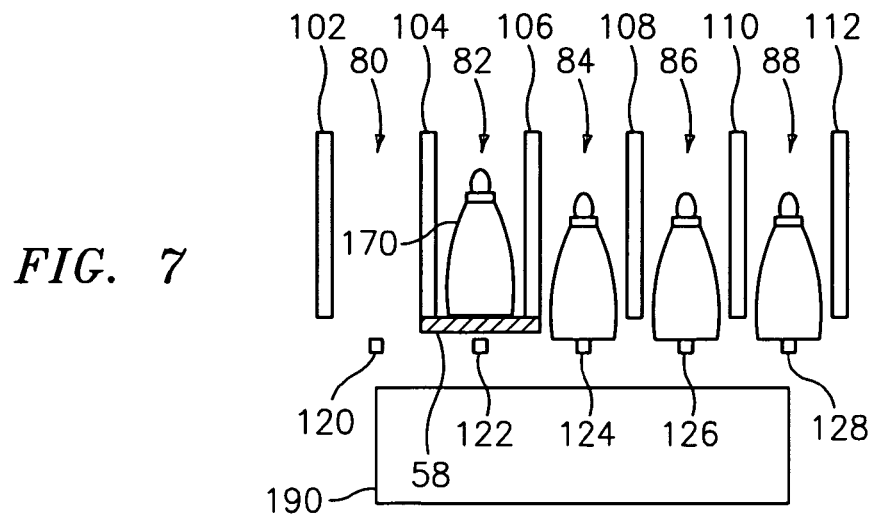
FIG. 7 is an end plan view of the grid section of FIG. 2A with the fourth lane being filled with product.

The number of products 170 allowed in a given lane depends on the size of the case being packaged. In the exemplary embodiment, the case is capable of holding sixteen containers of the product 170 (4×4 grid) (see FIG. 12). When the appropriate number of products 170 (i.e. four products 170) has entered the lane 88, the motor 62 (see FIG. 2A) energizes, shifting the end section 58 from under the lane 88 to the lane 86 as shown in FIG. 5. As the end section 58 is shifted, the product 170 in lane 86 contacts the lane guide 110. Since the lane guide is stationary at this point, the product 170 in lane 88 slides off the end section 58 and onto the support strip 128.

Figure 4:
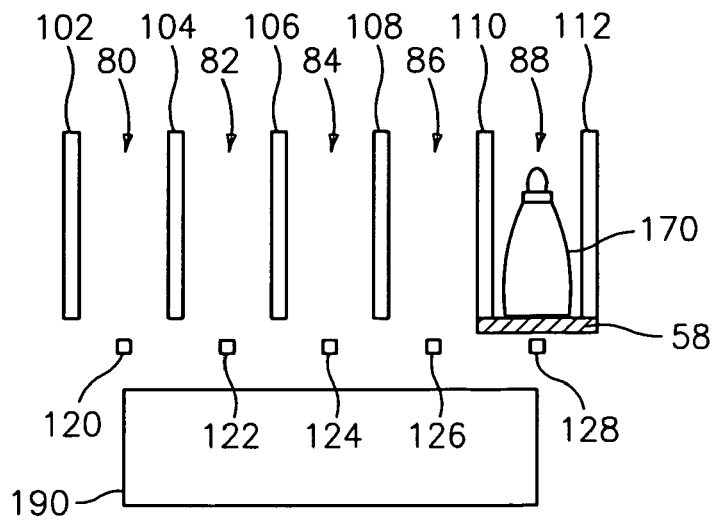
FIG. 4 is an end plan view of the grid section of FIG. 2A with the first lane being filled with product.
Figure 12:
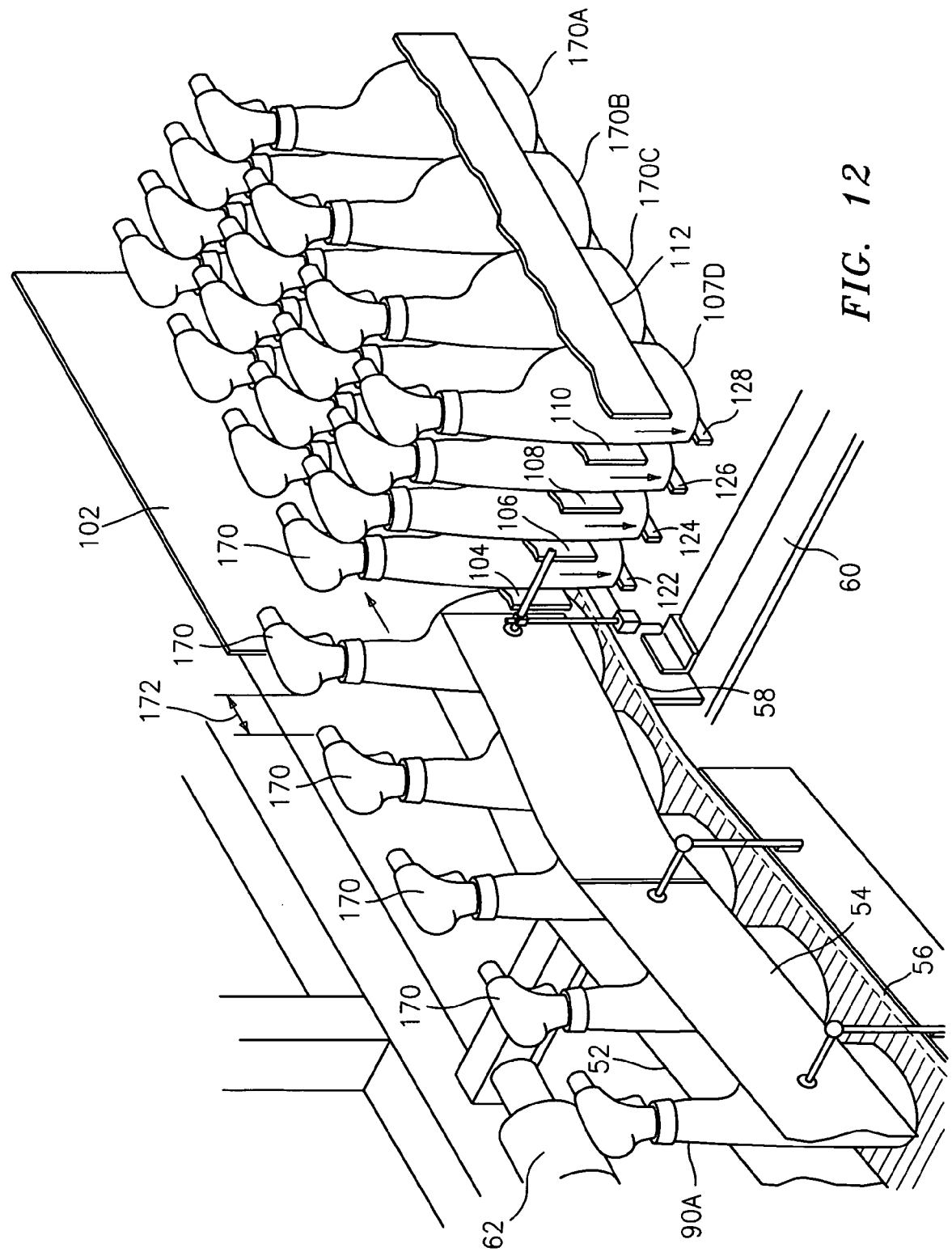
FIG. 12 is a top perspective view of the grid section shown in FIG. 2A being used to package variety packs.

Referring now to FIGS. 4, 5, and 12, the speed of the second conveyor 56 is adjusted so that the total time for the end section 58 to shift from lane 88 to 86 is less than the time it takes for conveyor 56 to move the product 170 the distance equal to the gap 172. This allows the lanes 88, 86, 84, 82, and 80 to be filled continuously using a constant conveyor speed and without the need for a brake used by prior art packaging machines. The elimination of the brake also eliminates the problems associated with line pressure. In addition, it will be recognized that the timing of the movement of the end section 58 from lane 88 to lane 86 will maintain the gap 172 between the products 170 within lane 86. In other words, the timing of the movement of end section 58 will eliminate wind-up within the lanes.

Figure 8:
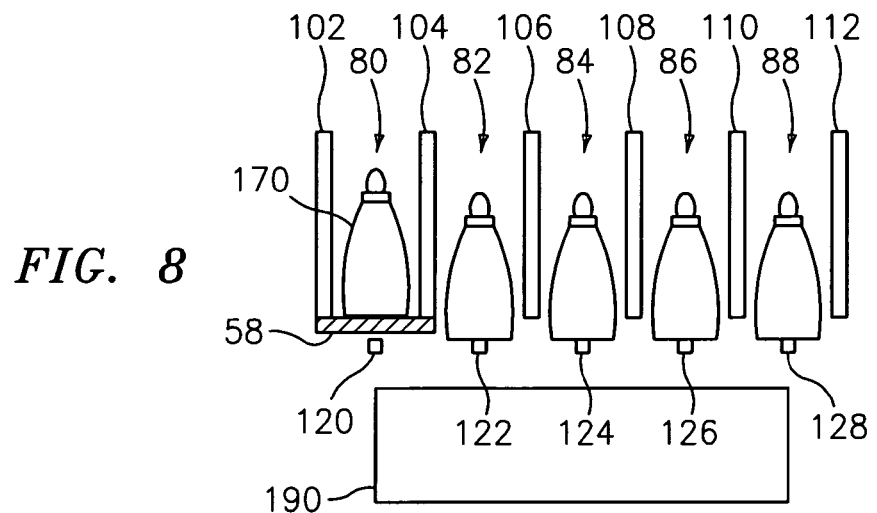
FIG. 8 is an end plan view of the grid section of FIG. 2A with the fifth lane being filled with product.
Figure 9:
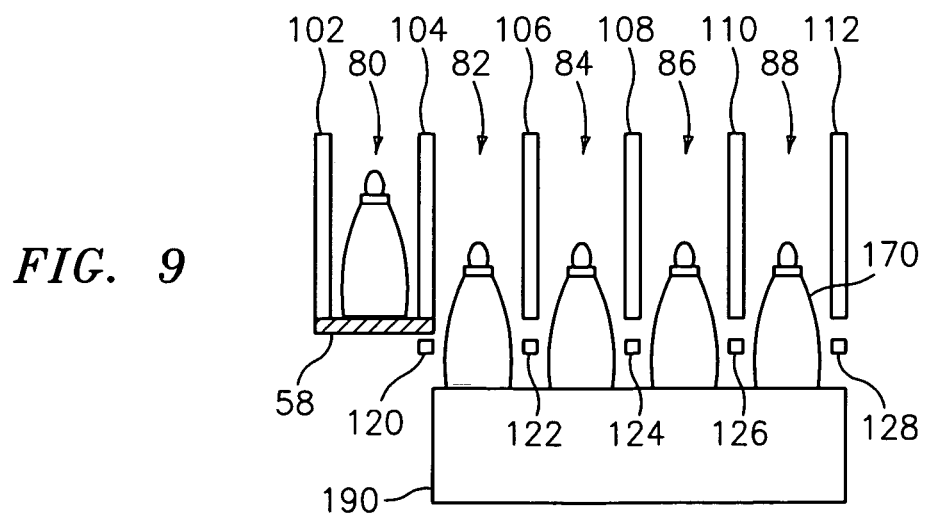
FIG. 9 is an end plan view of the grid section of FIG. 2A with product from lanes one through four being dropped into the case.

Referring to FIGS. 5-9 the filling of lanes 86, 84, and 82 will continue as described above and shown in FIGS. 5-7, with the lane guides 104, 106, and 108 retaining the products 170 in their respective lanes 82, 84, and 86 and resting on the associated support strips 122, 124, and 126. After the last product 170 enters lane 82, the end section 58 will once again shift to the next lane 80. The case 190 of the exemplary embodiment is capable of holding four rows of product 170. As shown in FIG. 9 there is enough product 170 in lanes 82, 84, 86, and 88 to fill the case 190 located on the lift table 34 directly below the support strips 122, 124, 126, and 128.

Referring to FIG. 9, as the product 170 is being loaded into the spare lane 80, the end section 58 and the lane guides 102, 104, 106, 108, 110, and 112 all shift simultaneously causing the lane guides 104, 106, 108, 110, and 112 to move the products 170 off their respective support strips 122, 124, 126, and 128. This allows the products 170 in lanes 82, 84, 86, and 88 to fall between the support strips 122, 124, 126, and 128 and into the case 190 on the lift table 34 (see FIG. 1). Because end section 58 is still located under lane 80, product 170 and lane 80 does not descend into case 190. The lane 80 continues to be filled with additional product 170 while the products 170 in lanes 82, 84, 86, and 88 descend into the case 190.

Figure 10:
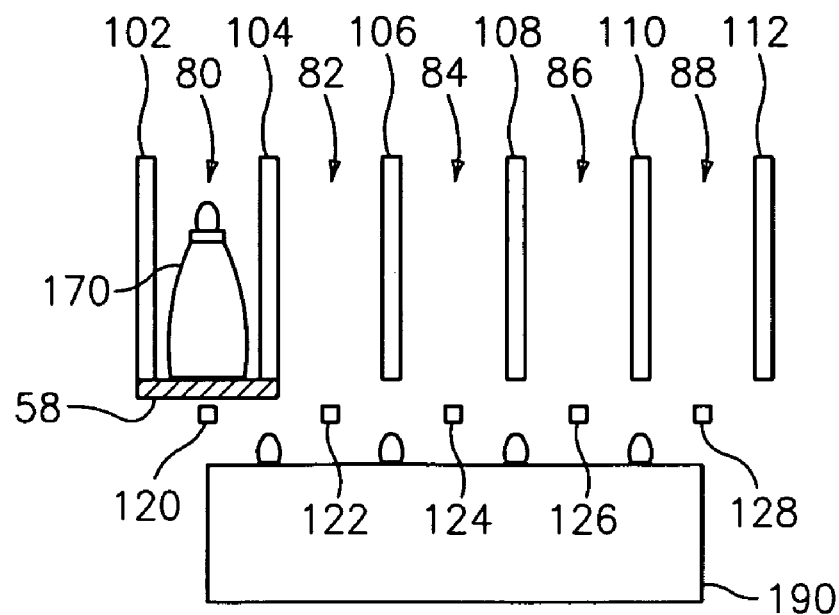
FIG. 10 is an end plan view of the grid section of FIG. 2A with the fifth lane being filled with product.

Referring to FIGS. 3 and 10, once the products 170 have fallen in to the case 190 the lane guides 102, 104, 106, 108, 110, and 112 shift simultaneous back to the original position and the lane 80 rests over the support strip 120. In the empty lanes 82, 84, 86, and 88, the plungers 180 are reset to the extended position by closing valve 186 and opening valve 184 allowing compressed air 185 to be injected into the chamber 63. The injection of air forces the plunger 61 to the extended position. The lift table 34 lowers the now full case 190 down to the case feed section 28 (shown in FIG. 1) where the full case 190 is automatically removed from the packaging machine 20 for further downstream processing. A new empty case 190 is opened by the case feed section 28 (shown in FIG. 1) and loaded on to the lift table 34 (shown in FIG. 1) ready to receive product.

Figure 11:
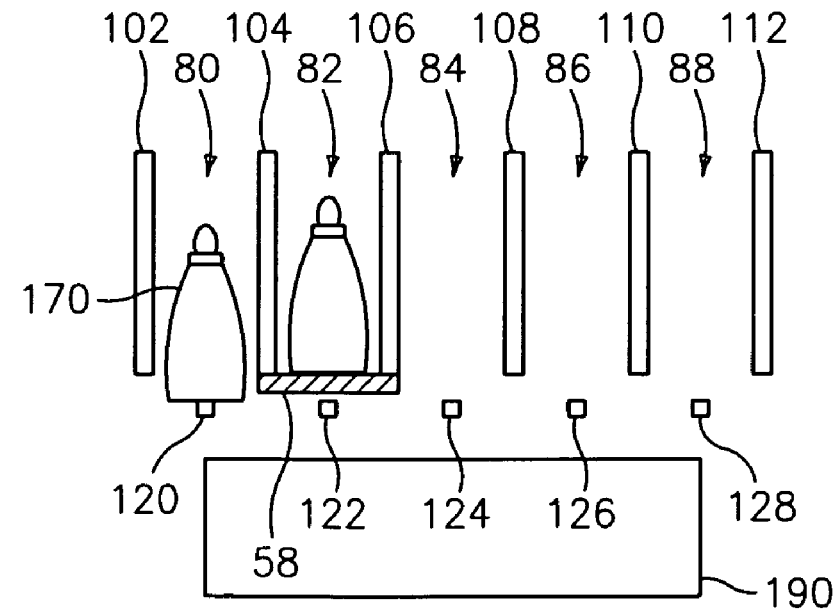
FIG. 11 is an end plan view of the grid section of FIG. 2A with the fourth lane being filled with product.

Referring to FIG. 11, once the appropriate number of products has been placed in grid lane 80, the process repeats itself in reverse. The conveyor shifts to lane 82 with the lane guide forcing the product in lane 80 to slide off and fall into support strip 120. The remaining lanes 82, 84, and 86 will be filled in the manner described above, with the spare lane for this cycle being lane 88. Thus, the process described allows for a continuous packaging of products 170 without the use of a line brake to stop the flow of products 170.

This continuous process also provides additional benefits. Unlike the hopper type arrangement of the prior art, the serial loading of product 170 described herein assures that the product 170 will be packaged into the case 190 on a first-in, first-out basis. Additionally, since the product 170 is continuously fed sequentially in to the grid lanes, as shown in FIGS. 4-12, it is possible to create a so called "variety pack" where different varieties of the product 170 are packaged into the same case 190. In this embodiment, it is desired to package different products 170A, 170B, 170C, and 170D together in case 190. Since the feed sequence of the product 170A, 170B, 170C, and 170D is maintained, the case 190 will always contain an equal number (i.e. four) of each variety of the product 170.

Referring to FIGS. 2A and 2D, the lanes 80, 82, 84, 86, and 88 are filled with the product 170 as described herein above. In this embodiment, once the lane 84 is filled with the product 170, the end section 58 starts to shift to lane 86. To prevent the product 170 from falling, high pressure air from supply line 166 is injected through the valves 164 to inflate the bladder pair 160. Once inflated, the bladder pair 160 securely holds the product 170 in place and prevents it from descending into the case (not shown) below.

As with the exemplary embodiment, when the end section 58 shifts to fill the spare lane 88, all the lanes 80, 82, 84, 86, and 88 shift to position the product 170 in lanes 80, 82, 84, 86, and 88 over the case (not shown). Once positioned, the air in the bladder pairs 160, 162 (and other bladder pairs not shown for the lanes 80 and 82) is removed through valve 164 allowing the bladder pairs to deflate, freeing the product 90 to descend into the case (not shown) below. The process then reverses itself and proceeds in the continuous manner described herein above. The use of the bladder pair to secure the products is advantageous when the product 170 is easily damaged and contact with the lane guides or the shock absorbing device is undesirable. The bladder pairs will also help align oval or non-circular products.

Figure 13:
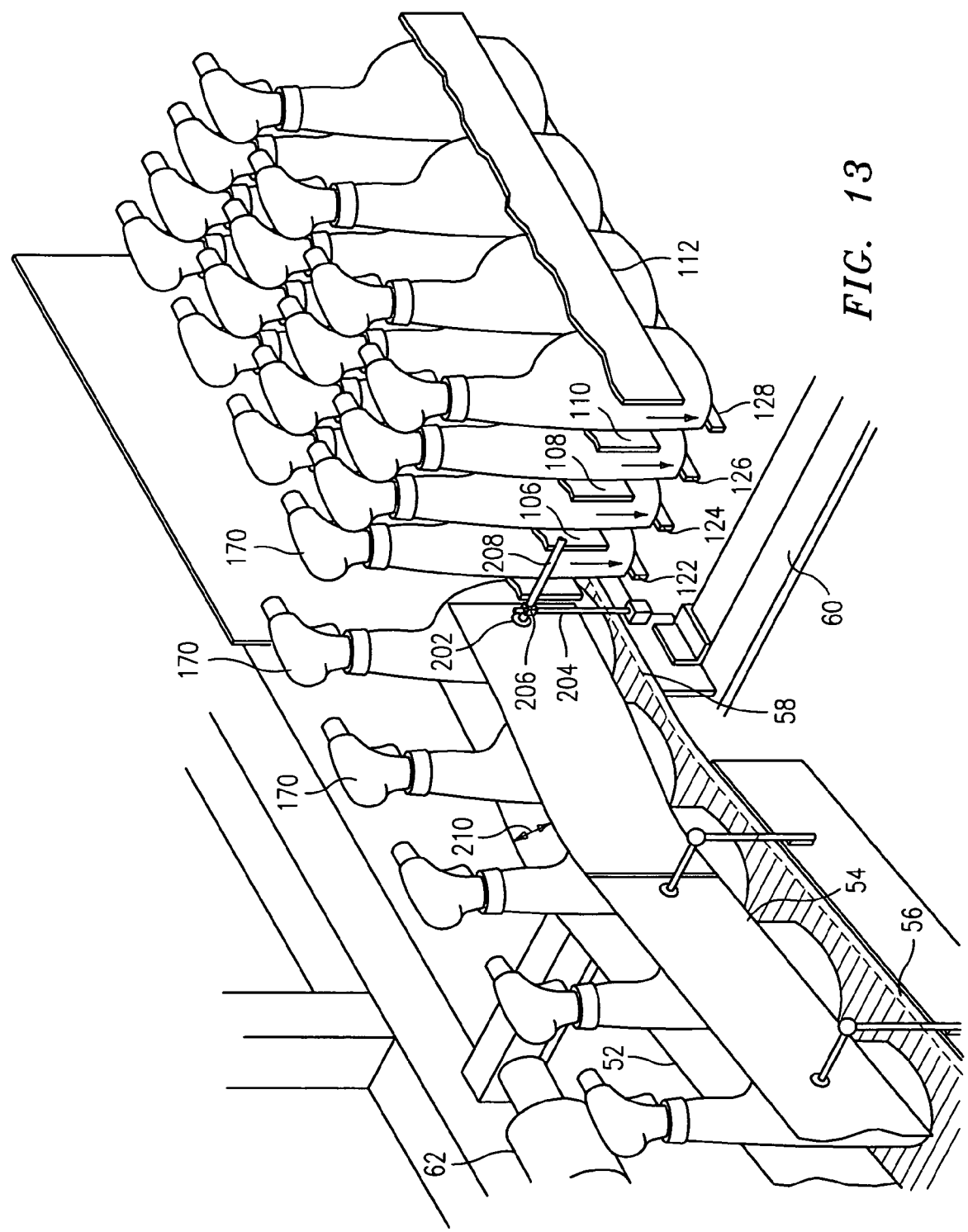
FIG. 13 is a top perspective view of the grid section shown in FIG. 2A.

Referring to FIG. 13, while the product moves on the conveyor 56, the product 170 is supported by a pair of flex guides 52 and 54. The flex guides 52 and 44 are made from a flexible plastic strip and can bend and move as the conveyor 56 pivots from one lane to the next. A pair of flex-supports 202 supports the lane guides 52 and 54. These supports 202 typically have a bracket 204 mounted adjacent to, and movable with the conveyor 56. The bracket 204 has a collar 206 on one end that receives a threaded rod 208. The rod 208 is attached at one end to the flex guides 52, and 54. The use of the threaded rod 208 and collar 206 allows a distance 210 between the flex guides 52 and 54 to be changed to accommodate different size products 170.

As described herein above, in the exemplary embodiment, the lane guides 102, 104, 106, 108, 110, and 112 are also adjustable to accommodate different size products 170. Alternately, the lane guides may be fixed relative to each other and mounted for easy removal and replacement to accommodate the different sizes of products 170.

It should be appreciated that this method of packaging products can be applied to any configuration grid. The exemplary embodiment illustrates a four-lane grid with four products per lane (4×4 grid). This method can be scaled up or down to meet the packaging size requirements of the product. The frame 136 (FIG. 2A) is adapted to receive additional lanes as needed by the operator. This gives the operator more flexibility and versatility in their use of the packing machine 20.

Figure 14:
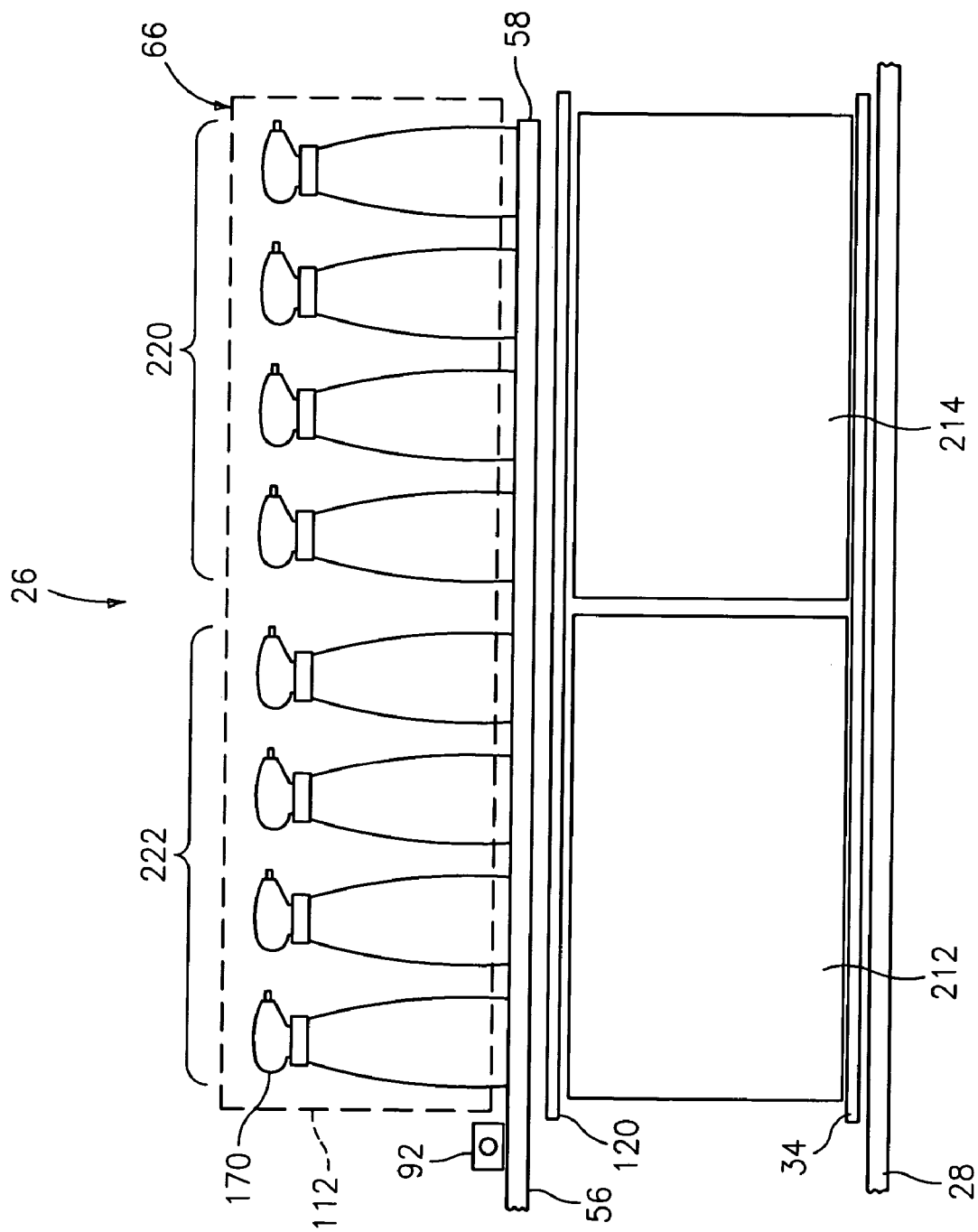
FIG. 14 is a side plan view of an alternate embodiment grid section for filling multiple cases simultaneously.

Referring to FIG. 14, an alternate embodiment grid section 26 is shown. In this example, two cases 212 and 214 are simultaneously packaged. To accomplish this, the grid components such as the end section 58, all lane guides (lane guide 112 is shown) and support strips (support strip 128 is shown) are extended to-match the combine length of cases 214 and 216. The case feed section 28 and lift table 34 are modified to load two cases 214 and 216 in series. Once this is done, the process continues as described herein above. The end section 58 loads the products 170 into the lane 88, the conveyor shifts to the next lane causing the products 170 to fall on the support strip 128. Once all four lanes are filled, the lane guides shift causing the products 170 in the front section 220 of the end section 58 will fall and be packaged in case 214 while those in the rear section 222 will fall and be packaged in case 212.

In an alternative exemplary embodiment, it should also be appreciated, that some products 170 can withstand some line pressure and that the spare lane can be eliminated from the machine. In that embodiment, the product 170 fills the number of lanes that correspond to the number of lanes needed to fill the case located below the grid section 26. The second conveyor 56 is then stopped while the lane guides 102, 104, 106, 108, 110, and 112 all shift simultaneously causing the lane guides 104, 106, 108, 110, and 112 to move the products 170 off their respective riding strips 122, 124, 126, and 128. This allows the products 170 in lanes 80, 82, 84, 86, and 88 to fall between the support strips 120, 122, 124, 126, and 128 and into the case 190 on the lift table 34 (see FIG. 1). Instead of the second conveyor 56 being located under the spare lane, second conveyor 56 is moved out from under each of the lanes filled with the product so that the product can descend into the case. The product 170 builds up some line pressure on the second conveyor 56 while the product 170 moves into the case.

The packaging machine 20 allows the line pressure to be controlled so that there may be some line pressure, if there is no spacing mechanism and no spare lane. In addition, the packaging machine 20 may be utilized with no line pressure, if the spacing mechanism is employed and/or the spare lane is employed. The packaging machine 20 allows the product 170 to be filled continuously using a constant conveyor speed and without the need for the brake used by prior art packaging machines. In addition, the packaging machine 20 may maintain the predetermined gap 172 between the products 170 within each lane, which will eliminate the wind-up within the lanes. Because line pressure and wind-up can be controlled so that line pressure and wind-up are minimized or eliminated, the drawbacks and deficiencies caused by line pressure and wind-up have also been eliminated. For example, the packaging machine 20 allows the packaging of irregularly shaped product container while eliminating the interlocking, tipping or mispackaging or the product caused by line pressure and wind-up. Additional benefits are also gained by continuously maintaining the feed sequence of product, including the packaging of variety packs and first-in, first-out basis packaging.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

The invention claimed is:

1. A packaging machine for packaging a product, the packaging machine comprising:
   an infeed section, said infeed section includes a conveyor belt having a first end and a second end;
   a grid section located adjacent to said infeed section, said grid section includes:
      a plurality of lane guides, said plurality of lane guides being spaced apart to form a plurality of lanes, said plurality of lanes includes an appropriate number of lanes to fill a case and a spare lane;
      a support device located at said plurality of lanes;
      a shifting assembly attached to said plurality of lane guides;
   a sensor mounted adjacent to said plurality of lanes; and
   a controller in electronic communication with said shifting assembly and said conveyor belt,
   wherein said first end of said conveyor belt extends beneath one of said plurality of lanes, said first end of said conveyor belt moves to each said plurality of lanes, said conveyor belt delivers the product to each of said plurality of lanes.

2. The packaging machine of claim 1, wherein said support device is a support strip, said support strip being located at each of said plurality of lanes and is located beneath said movable conveyor belt, said support strip supports the product.

3. The packaging machine of claim 1, wherein said support device is a bladder pair mounted to each of said plurality of lane guides.

4. The packaging machine of claim 1, further comprising a spacing mechanism disposed at said second end of said moveable conveyer belt.

5. The packaging machine of claim 4, wherein said spacing mechanism includes a screw.

6. The packaging machine of claim 4, wherein said spacing mechanism includes a side belt assembly.

* * * * *